United States Patent [19]

De Jule

[11] 4,352,101
[45] Sep. 28, 1982

[54] FLAT PANEL DISPLAY SYSTEM

[75] Inventor: Michael C. De Jule, Chicago, Ill.

[73] Assignee: Lucitron, Inc., Northbrook, Ill.

[21] Appl. No.: 161,504

[22] Filed: Jun. 20, 1980

[51] Int. Cl.³ .............................................. G09G 3/28
[52] U.S. Cl. ................................. 340/769; 315/169.2;
340/773; 340/779; 358/240
[58] Field of Search ............................. 340/769, 768;
315/169.2; 358/240

[56] References Cited

U.S. PATENT DOCUMENTS 2,925,530  2/1960  Engelbart ........................ 315/169.2
3,940,757  2/1976  Purchase ........................ 358/240 X
4,229,766  10/1980  Sipos .............................. 358/240 X Primary Examiner—David L. Trafton
Attorney, Agent, or Firm—Neuman, Williams, Anderson & Olson

[57] ABSTRACT

A flat panel display arrangement is disclosed in which a plurality of plasma sacs are simultaneously generated from cathodes in sections disposed in side-by-side relation, supporting walls being provided between adjacent sections. Row and column electrodes are provided in orthogonal relation for effecting simultaneous scanning of all sections, using a zig-zag scanning arrangement.

20 Claims, 7 Drawing Figures

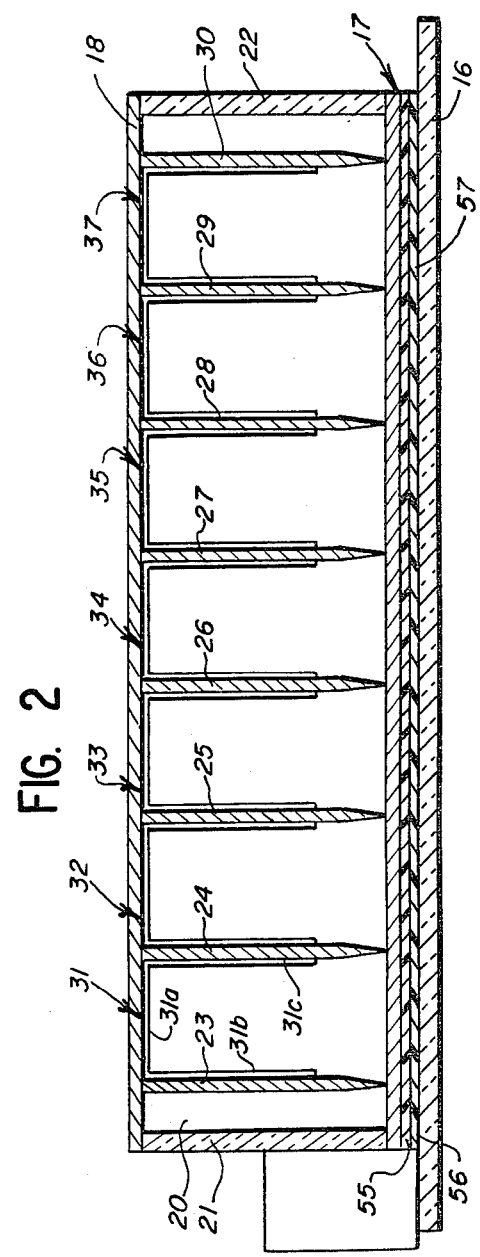
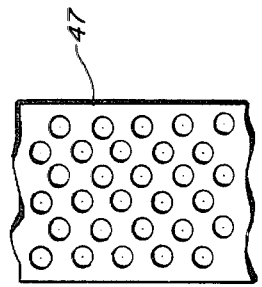
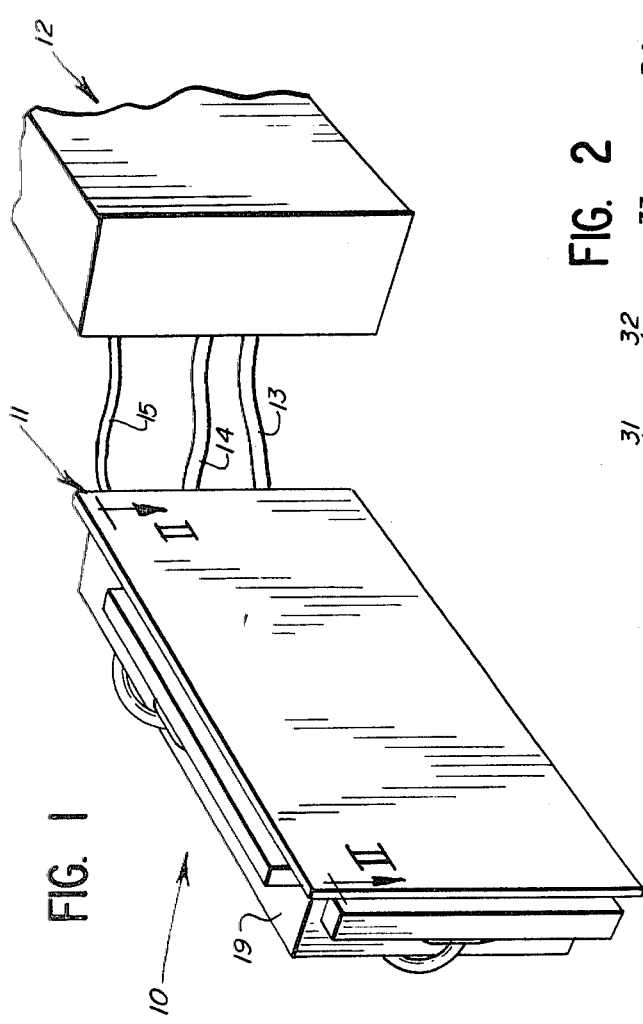

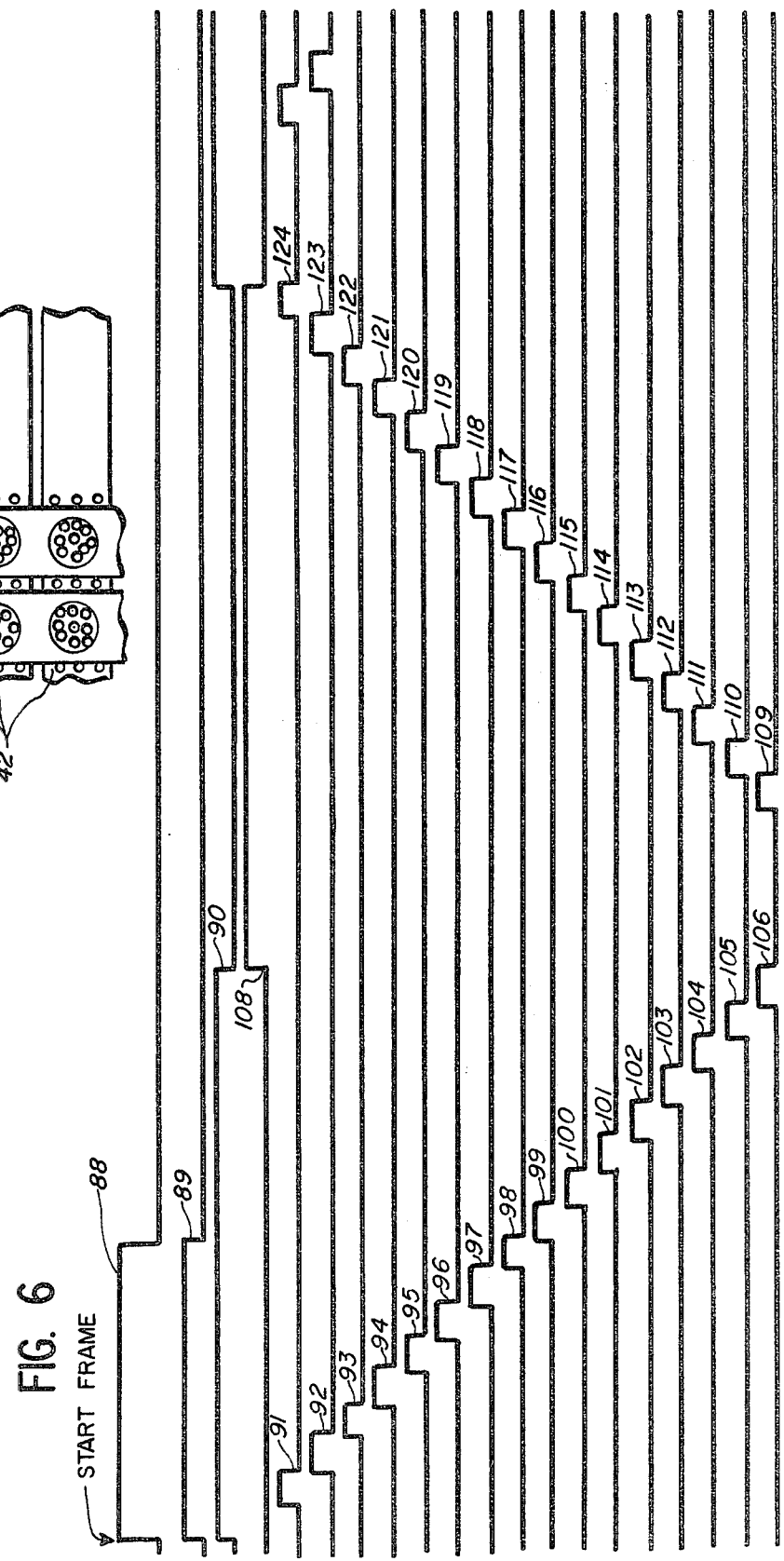

FLAT PANEL DISPLAY SYSTEM

This invention relates to a flat panel display system and more particularly to a flat panel display system utilizing a plasma sac scanning and which produces a highly accurate raster type display with uniform luminance characteristics throughout while having minimum complexity and being readily and economically manufacturable. The display panel of the system may be of any desired size and its area may be many times larger than the area obtainable with conventional displays. The system is further advantageous in that it does not require highly expensive, complex and bulky electronic control and drive circuitry.

BACKGROUND OF THE INVENTION

Various flat panel displays have heretofore been proposed for producing a television picture or for alphanumeric and computer graphic display purposes. The systems as proposed would have manifest advantages with respect to the size of the image which might be displayed, when compared with conventional television picture tubes in which any increase in picture area greater than an area having about a 25 inch diagonal measurement results in an inordinate increase in bulk and weight. However, the arrangements as heretofore proposed have either been inoperable or have been so impractical or expensive that they have not been used successfully other than for experimental purposes and in special applications.

In certain of the prior art systems, individual cells or units are provided for producing each image spot, each cell or unit being operable independently of the other, with a matrix of row and column conductors being driven electrically to effect sequential operation of the cells in a predetermined raster pattern. Such arrangements have been very expensive to construct and have required circuitry which is complex and expensive.

With regard to particular prior art disclosures, the Watanabe U.S. Pat. No. 3,622,829 proposed a flat panel display arrangement using a gas plasma as a cathode with electrons being extracted from the plasma by a positive-potential mesh to be directed toward a control-grid array. The grid as disclosed is in the form of a set of holes in a substrate with electrodes in parallel strips along one surface of the substrate and with a second set of parallel strips along the other surface of the substrate, in orthogonal relation to the first set. By applying positive potentials to any selected pair of the two sets of electrodes, the electrons are extracted from the plasma and accelerated to strike a phosphor and produce a luminescent spot.

The Watanabe arrangement would have the potential advantage of increased efficiency and brightness, as compared to systems using other types of cathodes, but there would be practical difficulties in attempting to use the system, especially in a large size display. One problem which is not mentioned or recognized in the Watanabe patent is the problem of support of the front and rear walls of the panel, when the panel is of large size. Since the absolute pressure within the device must be quite low, the atmospheric pressure applied to the front and rear walls can produce extremely large forces when the device is of a large size. For example, in a panel which is 30 inches square, the total forces applied to the front and rear walls may be well over 10,000 pounds and such walls would have to be quite thick and heavy.

Another problem with the Watanabe type of design is with respect to the electrical circuitry required to drive all of the electrodes of both sets.

Certain problems with the Watanabe type of design may be overcome in devices using plasma sac scanning. The production of a plasma sac is described in a journal article entitled "A Picture-Display Panel Using a Constricted Glow Discharge", by H. Hori et al, IEEE transactions on Electron Devices, Vol. ED-21, No. 6, June 1974. As described, a plasma sac is caused to be produced on the cathode side of an apertured insulator and by controlling the potential applied to electrodes, the plasma sac may be caused to move from one aperture to another.

The Miyashiro et al. U.S. Pat. No. 3,749,969 also discloses a plasma sac and discloses a two-dimensional scanning arrangement for effecting movement of the plasma sac in a flat panel type of display. To scan a row, a sac is initiated at the start of the row and is caused to move progressively from cell to cell by changes in the potential on a control electrode associated with each of the cells. Such an arrangement has the potential of reducing the complexity, size and cost of the circuitry required to effect a scanning operation. However, the aforementioned problems with respect to the permissible size of the displays are not recognized and dealt with.

In my U.S. Pat. No. 4,130,777 I disclose a scanning means and method for a plasma-sac-type gas-discharge image display panel in which a plurality of electron-beam-generating plasma sacs are simultaneously formed from a gas-discharge plasma or plasmas and in which scanning means are provided for activating in sequence and group-by-group consecutive groups of plasma sacs in a row until an entire row is scanned.

The scanning means and method as disclosed in my aforesaid patent are highly advantageous. However, certain problems with respect to constructing a large size image display panel were not recognized. In particular, my patent discloses the use of a plurality of elongated hollow cathodes on side-by-side relation with there being a limited number of row electrodes associated with each hollow cathode. The front wall of the panel is disclosed as being supported from the forward edges of supporting walls which extend between the electrodes of the hollow cathodes to separate one hollow cathode from the cathodes adjacent thereto, the electrode structure and associated insulators being interposed between such forward edges and the front wall.

With such supporting walls, it would be possible to support the front and rear walls of a panel having a very large size since the spacing distance between one supporting wall to another may be quite small and a large number of supporting walls can be provided extending throughout the entire area of the panel. Thus, the arrangement would not only provide adequate support for the front and rear walls, but would permit such walls to be relatively thin and light in weight.

A problem with such a construction, not recognized in my patent and not recognizable from consideration of the prior art, is with regard to effecting scanning of the rows which are adjacent the supporting walls. It is found that blank spaces are produced in the image for the reason that scanning of rows near such supporting walls is unreliable. After investigation of the problem, it was found that the walls apparently produce a non-uniform field distribution such that in many cases, the plasma sac has a tendency to either move away from the wall or to become extinguished when scanning potentials are applied to the column electrodes designed to produce scanning movement parallel to the wall. It was found that in some cases, the plasma sac improperly moved along a row spaced a distance from the wall rather than a row adjacent thereto.

SUMMARY OF THE INVENTION

This invention was evolved with the general object of overcoming disadvantages of prior art arrangements and of providing a flat panel display which can be of any desired size and which will produce uniform luminescense characteristics throughout the entire area of display.

Another object of the invention is to provide a flat panel display arrangement which is readily and economically manufacturable even when of quite large size.

A further object of the invention is to provide a flat panel display arrangement which produces a very bright image while being highly efficient and reliable.

An important aspect of the invention is in the recognition of the aforementioned problem with the construction of my U.S. Pat. No. 4,130,177 and in the discovery that a plasma sac may be reliably moved in a path adjacent a support wall by control of the field distribution adjacent such a path.

As a result of my discovery and in accordance with this invention, a flat panel display is provided which preferably includes means for developing a plasma sac movable in a certain pattern to produce a visible scanning spot behind a front wall of the device. The front wall is supported from the front edges of side walls and from the front edges of a plurality of intermediate supporting walls spaced in parallel relation the side walls. To effect the scanning movement of the spot, electrode means are provided including electrodes which extend in parallel relation to each other and in transverse relation to the intermediate supporting walls. In addition, the electrode means include portions adjacent the edges of the supporting walls, in parallel relation to such walls and in transverse relation to the other electrodes. A suitable potential may be applied to the additional electrode in a manner such that scanning movement of the spot may be effected from one position to another along the front edge of the supporting wall.

With this comparatively simple arrangement, it is possible to have display points which are uniformly distributed throughout the entire viewing area of the panel and to produce luminence characteristics which are substantially uniform at all such display points, including points which are adjacent the front edges of supporting walls, as well as points which are spaced a substantial distance therefrom.

The construction of the display arrangement of the invention may be similar to that of my aforesaid U.S. Pat. No. 4,130,777, differing therefrom in that it includes row and column electrodes in orthogonal relation and also with respect to the manner of application of control signals to allow scanning movement along the front edge of a supporting wall.

One embodiment of the invention also differs from that of my patent with respect to the orientation of supporting walls. In the construction of my patent, the plasma sac in scanning a row which corresponds to the scanning of one line of an image is caused to move in a direction parallel to supporting walls, there being a plurality of rows corresponding to each hollow cathode between supporting walls. In one embodiment in accordance with the invention, however, the direction of scanning of rows is transverse to supporting walls, rather than parallel to such walls as in the construction of my patent. With this arrangement, the hollow cathodes provided between supporting walls are thus in a vertical column direction rather than in a horizontal row direction.

Another important feature of the invention relates to a multiple sac arrangement for simultaneous scanning of display points in a plurality of sections. The display is divided into a plurality of sections in adjacent relation and hollow cathodes associated with such sections are operable to simultaneously produce a plurality of plasma sacs with one plasma sac being produced in each section. All of such plasma sacs are movable simultaneously to effect simultaneous scanning of the display points of all sections.

An important advantage of this arrangement is that the velocity of movement of the plasma sacs required in any given application can be greatly reduced with respect to the velocity of movement required in prior one-point-at-a-time scanning arrangements in which the scanning of a row is effected at the line scan rate. For television and similar applications, the arrangement may require a storage of a video signal in a manner such as to permit the simultaneous scanning movement a plurality of sacs. However, the required signal storage capabilities of the system are not difficult to provide. In particular, by combining this multiple sac simultaneous scan feature with the vertical orientation of the cathodes, all sacs are in one row and only one scan line of an input video signal need be stored at any one time.

Another important feature of the arrangement relates to a combination of one or more of the aforementioned features with a zig-zag scanning arrangement in which each sac is moved along each row from one column to another within its section until reaching the column at one end of the row, the sac being then moved along that column to the adjacent end of the next adjacent row and thence in an opposite direction from one column to another along the adjacent row. With this arrangement, the sac may be produced at one end of the section and may scan all display points within the section, no reinstitution of the sac being required.

The sac may be initiated at one end of a section at the field or frame rate of a video signal and, in accordance with a specific feature of the invention, the sac may be developed at a central point of a section, at a point spaced from the supporting walls which define the section.

Additional features of the invention relate to configurations of electrodes and other elements of the panel and to the manner of assembly thereof to obtain improved performance and reliability while allowing construction of the panel at low cost.

Further features relate to the combination of the panel with electrical circuitry operative to obtain and utilize the advantages of the capabilities of scanning adjacent a supporting wall and the advantages of the multiplesac simultaneous scan feature. The electrical circuitry of the illustrated embodiment is such as to permit reproduction of pictures from standard signals of the type produced in conventional television systems and its includes features which may be used in other types of displays.

This invention contemplates other objects, features and advantages which will become more fully apparent from the following detailed description taken in conjunction with the accompanying drawings.

BRIEF DESCRIPTION OF THE DRAWINGS

FIG. 1 is a perspective view of a flat panel display system constructed in accordance with the invention;

FIG. 2 is a sectional view taken substantially along line II—II of FIG. 1;

FIG. 4 is a view on an enlarged scale illustrating a portion of one column electrode of the panel and the provision of apertures therein;

FIG. 6 illustrates waveforms produced at certain points of the circuitry for explaining the operation thereof; and FIG. 7 illustrates a modified electrode arrangement.

DESCRIPTION OF A PREFERRED EMBODIMENT

Figure 3:
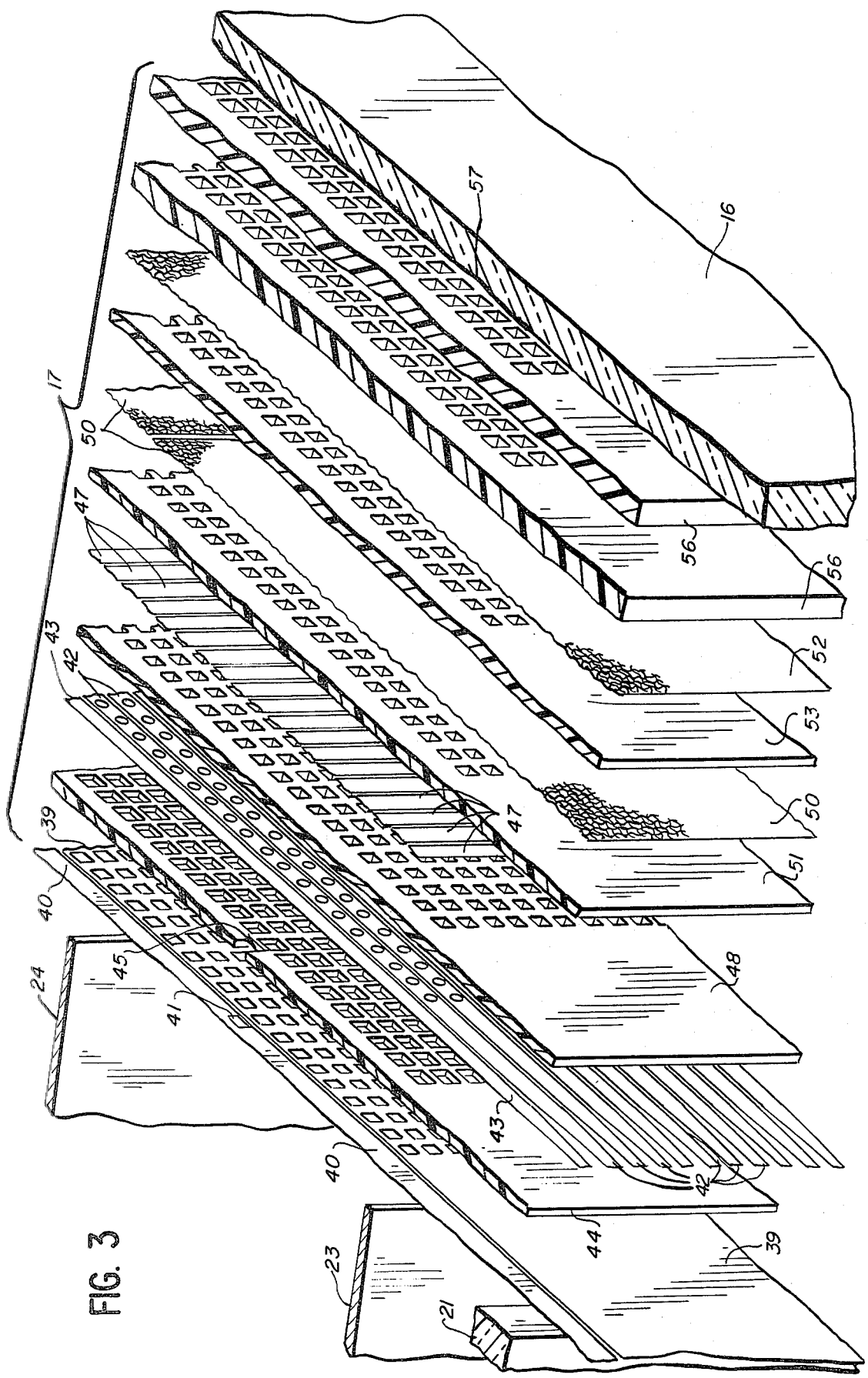
FIG. 3 is an exploded isometric view illustrating portions of electrodes, spacers and other elements of the panel and the relationship and manner of assembly thereof.

Reference numeral 10 generally designates a flat panel display system constructed in accordance with the principles of this invention. The illustrated system 10 comprises a display panel unit 11 connected to a control unit 12 through suitable cables 13, 14 and 15. The display panel unit 11 as illustrated and specifically described herein is a comparatively small unit having display points arranged in 88 rows and 112 columns and having limited applications. It has been used for testing and demonstration purposes in reproducing a small portion of a picture reproduced from broadcast television signals by a conventional television receiver and it will be understood that by increasing the size of the unit to provide more rows and columns, the unit might be used for reproducing a complete picture such as produced by a conventional television receiver. The horizontal and vertical dimensions of the structure as well as the dimensions of component elements may be increased or decreased as desired to produce a picture of any desired size. It is also noted that the system as illustrated and described is designed for black and white reproduction but the principles of the invention are applicable as well to systems designed for color reproduction.

Referring to FIG. 2, the panel unit 11 includes a transparent glass front wall 16, an electrode assembly 17 immediately behind the front wall 16 and a rear wall 18 which may be of any desired material. The unit 11 further includes top and bottom wall 19 and 20, a pair of side walls 21 and 22 and seven intermediate supporting walls 23, 24, 25, 26, 27, 28, 29 and 30 between the side walls 21 and 22, positioned in spaced vertical planes in parallel relationship to the side walls 21 and 22. The forward end portions of the supporting walls 23-30 are tapered to provide very narrow forward faces which are in supporting engagement with rearward surface portions of the electrode assembly, the front wall 16 being supported from the supporting walls 23-30 through the electrode assembly 17. With this arrangement, the front wall 16 can be relatively thin and can have a large area while being adequately supported, it being noted that the pressure within the panel is very low as compared to atmospheric pressure.

By way of example, the spacing of the center planes of the intermediate supporting walls 23-30 may be 1.12 inches and between each adjacent pair of supporting walls there may be sixteen columns of display points with 0.07 inch spacings between the center lines of the columns. With 88 rows of display elements, also having a 0.07 inch spacing, a display area of 6.16 by 7.84 inches is provided. The dimension of the supporting walls 23-30 as well as the top, bottom and side walls 19-22, between the rearward face of the electrode assembly 17 and the forward face of the rear wall 18, may be 2.2 inches and the overall depth of the panel may be approximately 2.7 inches.

It should be noted that the foregoing dimensions as well as those set forth hereinafter are provided for the purpose of illustrative example and are not to be construed as limitations.

In general, the unit 11 is designed to reproduce a picture by producing light of variable intensity at the display points which are arranged in rows and columns. The light at each display point is produced by accelerating electrons to a high velocity and impinging them on a cathodoluminescent picture element on the rear surface of the front wall 16, the brightness being controlled by the magnitude of a video signal applied to a control electrode.

The source of the electrons is a plasma sac which is produced in the rearward portion of the electrode assembly. In the illustrated embodiment, it is produced from ionized gas within a hollow cathode of generally U-shaped cross-sectional configuration. To scan the display points, signals are applied to row and column electrodes in a manner such that a plasma sac is moved from one display point to another in a certain pattern.

Important features of the invention relate to the simultaneous production of a plurality of plasma sacs from hollow cathodes which are located between adjacent ones of the supporting walls 23-30, seven hollow cathodes 31-37 being provided, and to the use of a zig-zag scanning arrangement with signals being applied to scanning electrodes in a manner such that the plasma sacs may be moved into close proximity to a supporting wall. With these features, display points are uniformly distributed throughout the entire viewing area of a panel and the luminence characteristics at all display points are substantially uniform. At the same time, the arrangement allows use of supporting walls spaced short distances apart to provide the advantageous support of the front and rear walls of the unit.

The hollow cathode 31 is formed by a member of sheet metal having a generally U-shaped cross-sectional configuration and including a portion 31a disposed against the forward surface of the rear wall 18 and portions 31b and 31c which extend forwardly along the surfaces of the supporting walls 23 and 24 to forward edges which are spaced rearwardly a substantial distance from the electrode assembly 17. The construction of the other hollow cathodes 32-37 is the same as that of the hollow cathode 31.

The construction of the electrode assembly is illustrated in FIG. 3 which is an exploded isometric view illustrating portions of electrodes, spacers and other elements. The assembly 17 includes two electrodes 39 and 40 in a common plane, such electrodes being formed of very thin conductive metal which may, for example, be 0.003 inches in thickness. The electrode 39 has openings therethrough in rows and columns corresponding to display points of the picture to be produced, there being sixteen columns between each adjacent pair of the supporting walls and there being 88 rows in the disclosed embodiment. Electrode 39 is operated at a potential such as to develop a biasing field which prevents unwanted electrons from entering the assembly 17 and thereby cuts down unwanted background light.

The electrode 40 extends along the upper edge of the electrode 39 and includes a series of openings, one for each cathode, located at intermediate positions with respect to the supporting walls. Thus, as illustrated in FIG. 3, there is one opening 41 in the electrode 40 located about mid-way between the walls 23 and 24. In the illustrated arrangement, opening 41 is in the ninth column and there are corresponding openings for each of the other hollow cathodes in the ninth column thereof. The electrode 40 is used for the purpose of initiating development of a plasma sac at the openings therein.

A plurality of row electrodes 42, are provided in a common plane in forwardly spaced relation to the electrode 39, the row electrodes 42 having openings aligned with the openings in the electrode 39. Another electrode 43 is provided in co-planar relation to the row electrodes 42 and is positioned above the uppermost row electrode in alignment with the electrode 40. An insulating spacer 44 is provided between the plane of the electrodes 39 and 40 and the plane of the electrodes 42 and 43. The spacer 44 has openings aligned with the openings in the electrodes 39 and 40 and has an opening 45 aligned with opening 41 of electrode 40. A plasma sac is initially developed in opening 45 at the start of a frame.

A plurality of column electrodes 47 are positioned in a common plane spaced forwardly from the plane of the row electrodes 42 and the control electrode 43, there being one column electrode 47 for each column of the display. An insulating spacer 48 is provided between the column electrodes 47 and the electrodes 42 and 43, the spacer 48 having openings aligned with the openings in the electrodes and spacer positioned rearwardly therefrom.

The construction of one of the column electrodes 47 is shown in FIG. 4 and, as shown, it has a multiplicity of openings therethrough, the purpose being to control positioning of a plasma sac which is disposed rearwardly with respect thereto while allowing passage of electrons therethrough in a manner as hereinafter described. By way of example, the column electrodes 47 may be in the form of thin ribbons of metal having a thickness of 0.003 inches, and having a width of 0.06 inches with holes being provided in six columns, the diameter of each hole being 0.0075 inches.

A plurality of intensity control electrodes 50 are provided in a plane spaced forwardly from the column electrodes 47. A spacer 51 is provided between the intensity control electrodes 50 and the column electrodes 47. Holes are provided in the spacer 51 in line with the openings in the spacers which are positioned rearwardly with respect thereto. The intensity control electrodes 50 may be in the form of etched sheets of metal having a thickness of 0.003 inches and having holes therethrough, the diameter of each hole being 0.0075 inches and the spacing between holes being like that of the holes in the column electrodes 47 as illustrated in FIG. 4. Video signals are applied to the electrodes 50 to control the brightness at the display point aligned with a plasma sac of each section.

A screen electrode 52 is positioned in a plane spaced forwardly from the plane of the intensity control electrodes 50, an insulating spacer 53 being provided between the screen electrode 52 and the intensity control electrodes 50. The screen electrode may be formed of a wire screen with a mesh size of 325 lines per inch and a wire diameter of 0.0011 inches.

A pair of spacers 55 and 56 are positioned between the screen electrode 52 and the rearward face of the forward wall 16, the spacers 55 and 56 having openings which register with the openings in the elements spaced rearwardly therefrom. The spacers 55 and 56 are for the purpose of providing a distance of substantial length for acceleration of electrons to a high velocity under the influence of a relatively high voltage. Two of such spacers 55 and 56 are provided in order to obtain adequate thickness without having a thickness to opening size ratio which would present difficulties in fabrication. An accelerating voltage which may be on the order of 4,000 volts is applied between the electrodes to the rear of the spacer 55 and an electrode 57 on the rear face of the front wall 16; the electrode 57 being in the form of a thin and substantially transparent tin oxide. A suitable cathodoluminiscent material is associated with the electrode 57 for producing light in response to bombardment by high velocity electrons.

In the construction of the panel unit 11, a tin oxide or the equivalent is deposited on the rear face of the glass front wall 16 along with a suitable phosphor. Then the high voltage spacers 55 and 56 are placed together and against the rear face of the front wall 16, followed by the other cathodes and spacers in the order as shown, the electrodes 39 and 40 being installed last to form the electrode assembly. The rear wall 18, top and bottom walls 19 and 20, side walls 21 and 22 and intermediate supporting walls 23–30 are also assembled with the hollow cathodes 31–37 positioned and secured between supporting walls in the manner as shown. Then the front wall 16 and the electrode assembly 17 positioned thereon are secured against the forward surfaces of the top, bottom, side and intermediate supporting walls, a frit seal being provided in a manner as known in the art. The space within the panel unit may then be evacuated and filled with a suitable gas, reference being made to my U.S. Pat. No. 4,130,777 for a description of gases suitable for the purpose. The pressure within the panel is then very low in relation to atmospheric pressure which is applied against the front and rear walls 16 and 18 as well as against the top, bottom and side walls 19–22. The intermediate supporting walls 23–30 provide support such that the front and rear walls can be relatively thin as compared to the thickness which would be required if they were supported only by the side and top and bottom walls.

In the operation of the panel, the hollow cathodes 31–37 are placed at a negative potential of on the order of 400 volts relative to the electrodes of the assembly 17 which are at potentials relatively close to reference ground potential, while a high voltage is applied to the electrode 57 relative to of on the order of 4,000 volts relative to ground potential. The hollow cathodes provide efficient sources of copious electrons from which a plasma sac may be formed in each section of the panel behind the row and column electrodes thereof, the plasma sac being movable from one position to another through application of voltage pulses to the row and column electrodes.

At the start of each frame of a scanning operation, a positive voltage pulse is applied to the electrode 40 and at the same time a positive voltage pulse is applied to the electrode 43 to cause development of plasma sacs in register with the openings 41 and 45 and additional plasma sacs in register with the corresponding openings of the other sections. Then, while a positive pulse is applied to the uppermost one of the row electrodes 42, pulses are applied sequentially to the column electrodes 47 within all sections and the sacs are moved down into the uppermost row and are then moved along the uppermost row to one end thereof. Thereafter, they are moved down into the second row and are moved to the opposite end thereof, a zig-zag scan operation being obtained.

Figure 5:
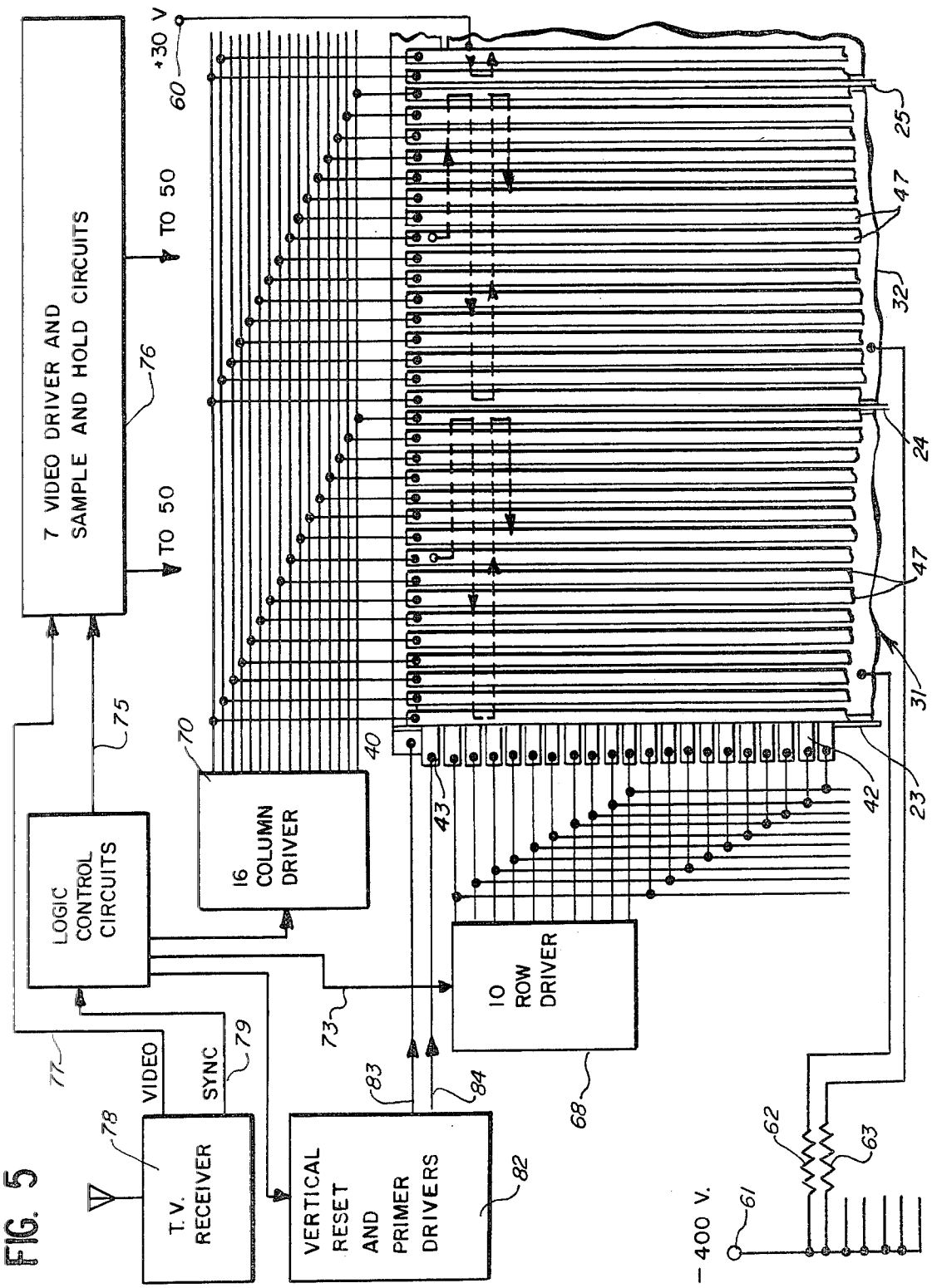
FIG. 5 diagrammatically illustrates, in front elevation, portions of row and column electrodes and other elements of the panel, illustrating the manner in which a zig-zag scan is achieved, and also illustrates electrical circuitry for energizing the panel.

The operation may be clarified after consideration of the circuit diagram of FIG. 5 and the waveform diagram of FIG. 6. The circuitry includes a power supply terminal 60 which is connected to the biasing electrode 39 and which may supply a voltage of on the order of plus 30 volts. The circuitry also includes a power supply terminal 61 which may supply a voltage of on the order of $-400$ volts and which is connected through current-limiting resistors 62 and 63 to the cathodes 31 and 32, as diagrammatically illustrated, and through similar current-limiting resistors to the cathodes of the other sections.

The circuitry further includes a row driver 68 which has ten outputs connected to buses which are connected to the row electrodes 42 in groups of ten, the outputs being respectively connected to the No.'s 1–10 electrodes, the No.'s 11–20 electrodes, etc., numbering the row electrodes 42 from top to bottom.

A column driver circuit 70 is provided having sixteen outputs which are connected to buses, the buses being connected to the sixteen column electrodes of each section.

The row and column driver circuits 68 and 70 are controllable from logic control circuits 72, which have the outputs connected through line 73 to the row driver circuits 68 and sixteen outputs connected through line 74 to inputs of the column driver circuit 70. The logic control circuits, when operating in a zig mode, apply signals to the column driver circuit 70 to apply pulses to the column electrodes of all sections in a sequence such as to move a scanning sac from left to right from the left side of each section to the right side thereof. In a zag mode, signals are applied to the column driver circuit 70 in a manner such as to cause movement of a scanning sac in the opposite direction, from right to left.

The logic control circuits 72 also apply control signals through a line 75, seven video driver and sample and hold circuits 76 which have seven outputs connected to the seven intensity control electrodes 50 for the seven sections of the illustrated panel. Circuits 76 have an input connected through line 77 to the video output of a T.V. receiver 78 which provides a source of input signals in the illustrated arrangement and which applies sync signals to logic control circuits 72 through a line 79. It will be understood that other sources of signals may be used.

When operating in the zig mode, video signals stored in a previous horizontal line time interval are applied from the circuits 76 to the intensity control electrodes 50 in the same order as received, the scanning movements of the sacs being from left to right. When operating in the zag mode, the signals stored in the previous horizontal line time interval are applied to the intensity control electrode in an order opposite that in which they were received, the scanning movements of the sacs being from right to left.

The logic control circuits 72 also apply control signals through line 81 to vertical reset and primer drivers 82 which have outputs connected through lines 83 and 84 to the primary electrode 40 and the reset electrode 43.

As shown in FIG. 6, the waveform of the signal applied to the electrode 40 is as indicated by reference numeral 88 and a signal is applied to the electrode 43 having a similar waveform 89 but having a different level.

Then, a drive signal is applied to the uppermost one of the row electrodes 42, i.e., the row No. 1 electrode, having a waveform as indicated by reference numeral 90. At the same time, scan pulses are sequentially applied to the column electrodes of the first section and to the column electrodes of the other sections, having a form as depicted by waveforms 91–106 in FIG. 6. After termination of the reset pulse 89, the plasma sacs are moved down into the uppermost row and are thereafter moved to the right, being positioned at the right-hand ends of the other sections through application of the pulse 106.

At this time, a drive pulse is applied to the No. 2 row electrode, having a waveform as indicated by reference numeral 108 and a sequence of scan pulses are then applied to the column electrodes as indicated by reference numerals 109–124. It is noted that the drive pulses 109–124 are applied in a reverse order, as compared to the drive pulses 91–106, and the sac is caused to move in the reverse direction, from right to left.

It is also noted that the zig and zag row pulses 90 and 108 may preferably overlap and may have leading edges which are in leading relation to the initial corresponding scan pulses, thus, for example, the leading edge of the pulse 108 may be in leading relation to the pulse 109, as shown in FIG. 6. The purpose of this feature is to insure movement of the sac from one row to another when it is at an end position, adjacent a supporting wall. It is found to be important that the field conditions be carefully controlled in order to insure movement of the sac from one point to another and that care should be exercised in the application of signals with the proper timing as well as the proper amplitudes.

It is noted that with the panel of the invention, a plurality of sacs are simultaneously generated during scanning of display points in one row and, as a result, the required velocity of movement of each sac is greatly reduced as compared to the velocity which would be required with a single sac operative to scan a row in one line interval. This feature is advantageous in obtaining a reliable scanning operation and is especially advantageous in a construction as illustrated in which the supporting walls extend vertically, allowing additional time for effecting movement of a scanning sac from one row to another at positions adjacent the supporting walls.

It is noted that although the operation of the panel has been described with reference to directions and velocities of movement of the plasma sacs, the sacs actually do not move and the operation is such that a sac is formed at one position and while it is extinguished, another sac is formed at an adjacent position.

The development of each sac establishes conditions for priming of another sac adjacent thereto and with the disclosed arrangement, a sac can be established at or "moved to" a position adjacent a supporting wall. However, it is difficult to reliably form an initial sac at a position close to a supporting wall and for this reason, an arrangement such as illustrated is highly advantageous, the initial development of the sac in each section being at a position intermediate the supporting walls and spaced a substantial distance therefrom.

In the panel 11 as described and illustrated, the row electrodes 42 are behind the column electrode 47. It is also possible to dispose row electrodes in front of column electrodes as depicted in FIG. 7 which is an enlarged rear elevational view showing positions of modified row electrodes designated by reference numeral' 42' and portions of modified column electrodes designated by reference numeral 47'.

In this arrangement, the row electrodes 42' may have a form like that of the column electrodes 47 of the panel 11, being formed with small holes therethrough, and the column electrodes 47' may have a form like that of the row electrodes 42 of the panel 11 being formed with larger holes therethrough. In each case, the electrode with the small holes is the forward-most electrode, is supplied with a higher voltage, forms the anode of the plasma sac and carries the majority of the sac current.

It is again noted that dimensions as specifically set forth herein as well as examples of numbers of sections, numbers of columns in each section, numbers of video drivers for each section, numbers of rows, operating voltages and other parameters are set forth by way of illustrative example and are not to be construed as limitations.

It will be understood that modifications and variations may be effected without departing from the spirit and scope of the novel concepts of this invention.

I claim:

1. In a flat panel display system, a display unit comprising a transparent front wall, a plurality of supporting walls having forward edges in supporting relation to spaced rear surface portions of said front wall, means for developing at least one plasma sac within said unit and behind said front wall in a region aligned with the space between two of said supporting walls, and first and second groups of electrodes for effecting scanning movements of said sac from one point to another within said region, said first group of electrodes extending in parallel relation to each other and in transverse relation to said supporting walls, and said second group of electrodes including electrodes adjacent the forward edges of said two of said supporting walls and operative in response to application of suitable potentials thereto to establish a field adjacent forward edges of said two of said supporting walls such as to allow movement of said sac to points within said region and in close proximity to said two of said supporting walls.

2. In a flat panel display system as defined in claim 1, said second group of electrodes including additional electrodes in parallel relation to those of said second group of electrodes which are adjacent the forward edge of said supporting walls, said first and second groups of electrodes being in crossing relationship.

3. In a flat panel display as defined in claim 1, said plasma-sac-developing means including cathode means in said space between said two of said supporting walls and behind said first and second groups of electrodes, and a member of insulating material between said electrodes and said space and having openings therein at positions in which said sac is established during scanning movement thereof.

4. In a flat panel display as defined in claim 1, said plasma-sac-developing means including cathode means behind said first and second groups of electrodes and a biasing electrode between said electrodes and said cathode means and having openings therein at positions in which said sac is established during scanning movement thereof.

5. In a flat panel display as defined in claim 4, a spacer member of insulating material between said biasing electrode and said first and second groups of electrodes and having openings therein aligned with openings in said biasing electrode.

6. In a flat panel display as defined in claim 1, said first and second groups of electrodes being in spaced planes parallel to said front wall, the electrodes in the more rearward plane having openings therein at positions in which said sac is established during scanning movement thereof.

7. In a flat panel display as defined in claim 1, the electrodes in the more forward plane being operative to carry a majority of the sac current to form the anode of the plasma sac.

8. In a flat panel display as defined in claim 7, the said electrodes in the more forward plane being supplied with a higher voltage than the electrodes in the more rearward plane.

9. In a flat panel display as defined in claim 6, the electrodes in the more forward plane having openings therein of substantially smaller size than the said openings in the electrodes in the more rearward plane.

10. In a flat panel display as defined in claim 9, electrode means behind the rearward face of said front wall having a cathodoluminescent material associated therewith and being supplied with a high voltage relative to the voltage supplied to said first and second groups of electrodes for bombardment of said material by high velocity electrons.

11. In a flat panel display system as defined in claim 10, intensity control electrode means between said high voltage electrode means and said first and second groups of electrodes and having small openings therein for passage of electrons therethrough.

12. In a flat panel display system as defined in claim 11, a screen electrode between said intensity control electrode and said high voltage electrode and having small openings therein for passage of electrons therethrough.

13. In a flat panel display system as defined in claim 12, a spacer member between said screen electrode and said high voltage electrode and having openings registering with said openings in said electrodes in said more rearward plane.

14. In a flat panel display system as defined in claim 1, there being more than two of said supporting walls to define a plurality of separate sections in said display unit, each section including means for developing a plasma sac and further including first and second groups of electrodes with the first group of electrodes of each section being formed as an extension of the first group of electrodes of each section adjacent thereto.

15. In a flat panel display system as defined in claim 14, said display unit defining display points in rows and columns with each of the sections having a plurality of columns and the said second group of electrodes including electrodes aligned with said columns, means for supplying signals to said second group of electrodes of all sections simultaneously for effecting simultaneous scanning movement of all plasma sections in all of said sections to effect simultaneous scanning of the display points of all sections.

16. In a flat panel display system as defined in claim 14, the plasma-sac-developing means of each of said sections including a hollow cathode between said supporting walls.

17. In a flat panel display system, a display unit defining display points in rows and columns and divided into a plurality of sections in side-by-side relation with a column along at least one side of each section being adjacent a column along one side of an adjacent section and with the rows of all sections being aligned, and plasma-sac-developing and scanning means associated with said display unit and including means for simultaneously producing a plurality of plasma sacs with one plasma sac being produced in each section and further including means for effecting simultaneous scanning movement of all plasma sacs to effect simultaneous scanning of the display points of all sections.

18. In a flat panel display system as defined in claim 17, said plasma-sac-developing and scanning means being operative in each section to develop a plasma sac at one end of said section and to effect scanning movement of said sac in a zig-zag fashion to the opposite end of said section, said sac being moved along each row to move from one column to another therein until reaching the column at one end of the row and being thence moved along that column to the adjacent end of the next adjacent row and thence in an opposite direction from one column to another along said next adjacent row.

19. In a flat panel display system as defined in claim 17, said plasma-sac-developing and scanning means included for each section, spaced column electrodes and spaced row electrodes in orthogonal relation.

20. In a flat panel display system as defined in claim 19, means including said plasma sacs for producing light at said display points and for controlling the intensity of the light so produced to cause said plurality of display points of all sections to produce a composite image.

* * * * *

UNITED STATES PATENT AND TRADEMARK OFFICE
CERTIFICATE OF CORRECTION

PATENT NO. : 4,352,101
DATED : September 28, 1982
INVENTOR(S) : MICHAEL C. DE JULE It is certified that error appears in the above-identified patent and that said Letters Patent are hereby corrected as shown below:

Column 2, line 41, delete "on" and insert -- in --.

Column 4, line 67, "its" should be -- it --.

Column 5, line 58, "wall" should be -- walls --.

Column 13, line 1 (claim 15), after "supplying", insert
     -- scanning --.

Signed and Sealed this

Fifteenth Day of February 1983

[SEAL]

Attest:

GERALD J. MOSSINGHOFF

Attesting Officer     Commissioner of Patents and Trademarks